UNITED STATES PATENT OFFICE.

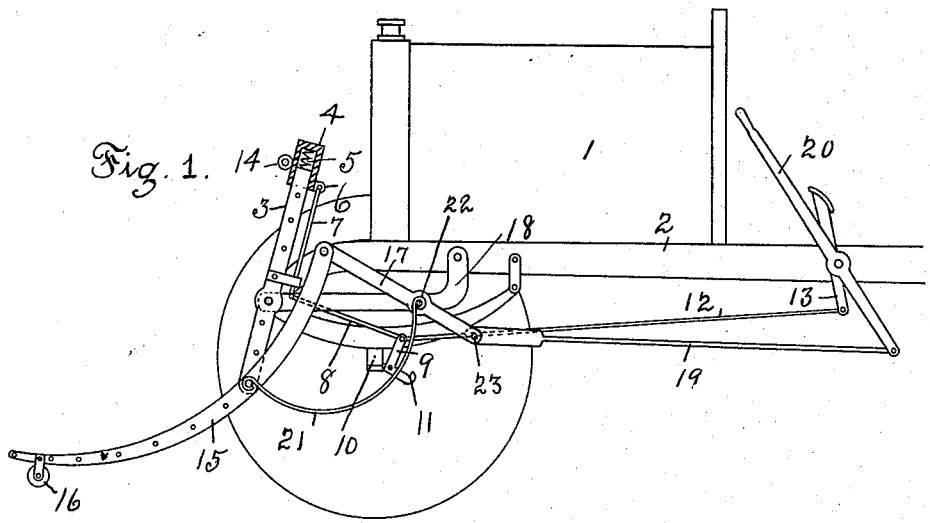
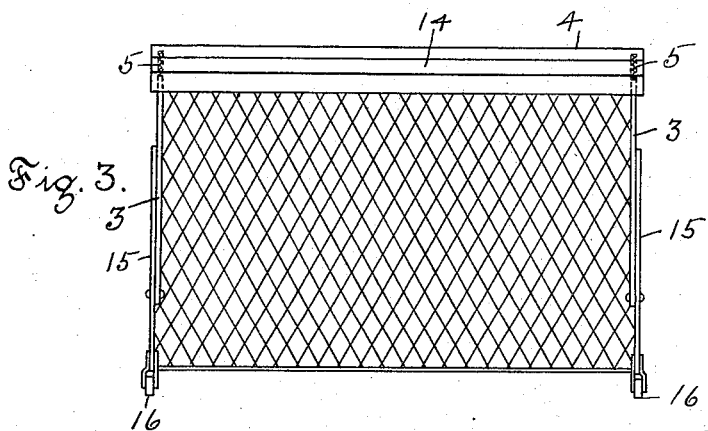
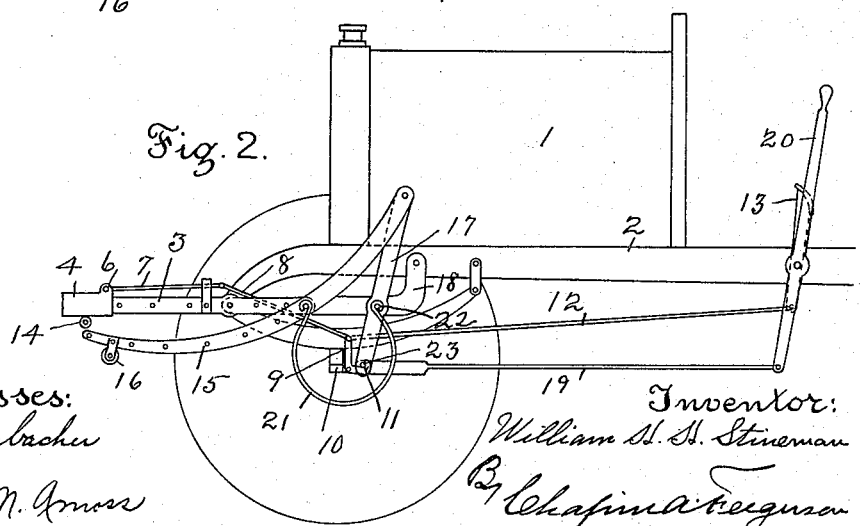

WILLIAM H. H. STINEMAN, OF BALTIMORE, MARYLAND, ASSIGNOR TO EDWARD P. HILL AND LUTHER G. GADD.

FENDER FOR MOTOR-VEHICLES.

1,166,724.	Specification of Letters Patent.	Patented Jan. 4, 1916.

Application filed April 17, 1915.   Serial No. 21,954.

*To all whom it may concern:*

Be it known that I, WILLIAM H. H. STINEMAN, a citizen of the United States, residing at Baltimore, in the State of Maryland, have invented certain new and useful Improvements in Fenders for Motor-Vehicles, of which the following is a specification.

This invention relates to improvements in fenders for automobiles and motor vehicles.

The object of the invention is to provide a fender so constructed that it will operate automatically when the buffer comes in contact with a person, or may be operated by the operator of the vehicle when there is impending danger of running into a person, whereby in either event the person struck will be picked up by the fender and prevented from being run over by the vehicle.

The invention consists of the novel construction and arrangement of the parts and combination of parts hereinafter more fully set forth in the following specification and pointed out in detail in the appended claims.

In the accompanying drawings, Figure 1 is a side elevation of my invention in the position it assumes when the buffer is struck or when released by the operator. Fig. 2 is also a side elevation of my invention in the raised or normal position. Fig. 3 is a detail front elevation of the fender.

Referring to the accompanying drawings, forming part of this specification, and in which like reference numerals designate like parts throughout the several views thereof, 1 designates the automobile or vehicle to which my device is secured. The vehicle 1 is provided with a frame 2 the front ends of which project out beyond the vehicle on opposite sides thereof, and to the outer ends of which are pivoted the side bars 3 of the buffer. The upper ends of the buffer bars 3 are connected by a buffer rod 4 which fits over said bars 3 and is held to its normal position by coiled springs 5. The inner edge of the rod 4 is provided with a lug 6 to which is secured one end of a rod 7, the opposite end of which latter is connected to a rod 8 which in turn is connected to one end of a bell-crank lever 9. The said bell crank lever 9 is pivoted to the axle 10 and is provided with a catch 11. The bell-crank lever 9 is also connected by a rod 12 to the lever 13 by means of which the bell-crank lever 9 is operated to release the catch 11 to allow the fender to fall into position. The buffer rod 4 is provided with a rubber tube 14 extending across the entire length thereof, on the under side, to relieve the force of the blow, and prevent injury by striking against said rod when the fender is lowered. To the lower or inner ends of the buffer bars 3 are pivoted the fender bars 15 which are connected by suitable meshed flexible material and are provided on their lower outer ends with rollers 16 to prevent the fender coming against the ground when being lowered. The upper or inner ends of the fender bars 15 are connected to one end of the arms 17, which latter are pivoted to the brackets 18 fixedly secured on opposite sides of the frame 2. The lower ends of the arms 17 are connected to the rod 19 which latter is connected to the lever 20 in the vehicle and which is operated by the operator of the car to raise the fender to its normal position. One end of a flat spring 21 is secured at each pivot point 22 and the other end is secured to the fender bars 15 and is normally exerting its pressure to throw the fender when the latter is released. The fender is held up in its normal position by the catch 11 which takes back of the pintle pin 23.

The operation of the device is as follows: The fender being in the normal, or raised position, as shown in Fig. 2, when the buffer strikes a person the blow against the buffer rod will cause it to yield against the action of the springs 5 and through the rods 7 and 8 operate the bell-crank lever 9 causing the catch 11 to release the arms 17 and allow the fender to fall, the movement of which is accelerated by the action of the flat springs 21. At the same time the fender is lowered the buffer is raised thereby forming a part of the fender. The fender may also be thrown into position by the operator by forcing the lever 13 forward with his foot, which, through the medium of the rod 12, operates the bell-crank lever 9 to release the catch 11. The fender is raised to its normal position by the operator pulling on the lever 20, which, through the medium of the rod 19, forces the lower ends of the arms 17 forward and raises the fender until the catch 11 comes back of the pintle pin 23. At the same time the fender is raised the buffer is lowered to its normal position.

Having thus described my invention, what I claim is:

1. The combination with a motor vehicle of a buffer pivoted to the front of said vehicle, a fender pivoted to said buffer, means to hold the fender to its normal raised position, and means to automatically lower the fender and raise the buffer simultaneously when the latter comes in contact with an object.

2. The combination with a motor vehicle of a buffer pivoted to the front of said vehicle, a fender pivoted to said buffer, means to hold the fender to its normal raised position, and means projecting into the vehicle for raising the buffer and lowering the fender simultaneously.

3. The combination with a motor vehicle of a buffer pivoted to the front of said vehicle, a fender pivoted to said buffer, means to hold the fender to its normal raised position, means to automatically lower the fender and raise the buffer simultaneously when the latter comes in contact with an object, and means projecting into the vehicle to raise the fender and lower the buffer.

4. The combination with a motor vehicle of a buffer pivoted to the front of said vehicle, a fender pivotally connected to the said vehicle, a latch to hold the fender in the raised position, and means connecting the buffer with said latch whereby the latch will be released and the fender lowered and the buffer raised simultaneously when the buffer comes into contact with an object.

5. The combination with a motor vehicle of a buffer pivoted to the front of the vehicle frame and having a yielding rod across the front thereof, a fender pivoted to said buffer, and means whereby when the said yielding rod comes into contact with an object the fender will be lowered and the buffer raised simultaneously.

6. The combination with a motor vehicle of a buffer pivoted to the front of the vehicle frame and having a yielding rod across the front thereof, a fender pivoted to said buffer, a latch to hold the fender to its normal raised position, and means connecting the said latch with the yielding rod of the buffer whereby when the latter comes into contact with an object the fender will be lowered and the buffer raised simultaneously.

In testimony whereof I affix my signature in presence of two witnesses.

WILLIAM H. H. STINEMAN.

Witnesses:
CHAPIN A. FERGUSON,
MAUDE M. AMOSS.

Copies of this patent may be obtained for five cents each, by addressing the "Commissioner of Patents. Washington, D. C."